Dec. 10, 1935.  F. C. FERK  2,023,806
BUMPER SIGNAL
Filed Nov. 13, 1933
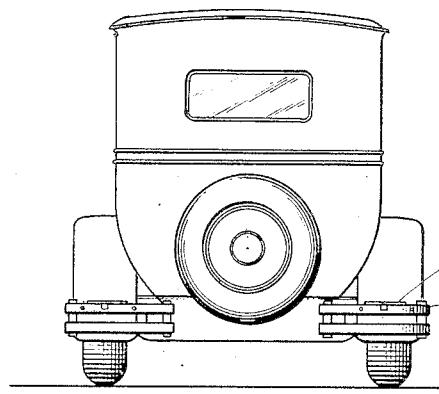
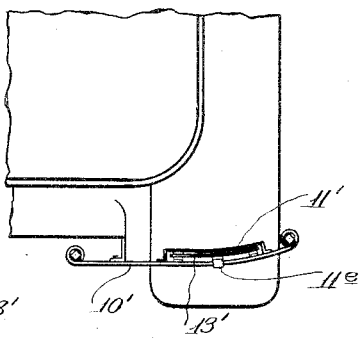
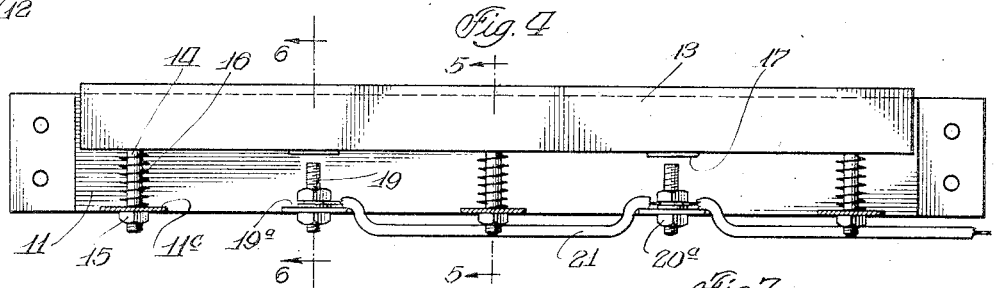
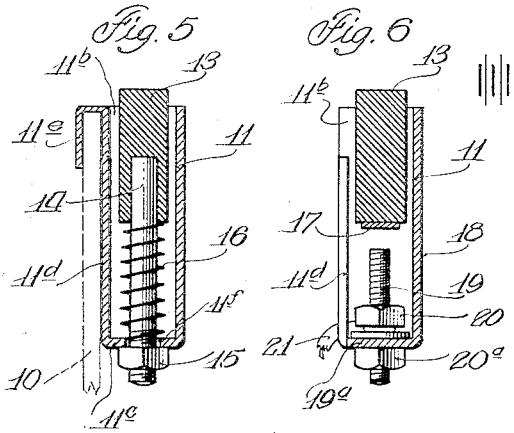
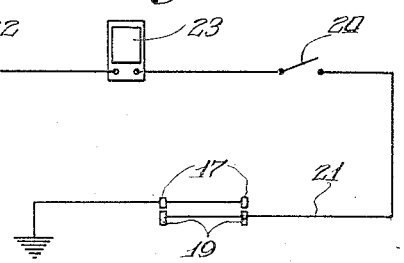
Inventor:
Frank C. Ferk.
Milo B. Stevens & Co.
By: Atty's.

Patented Dec. 10, 1935

2,023,806

UNITED STATES PATENT OFFICE 2,023,806

BUMPER SIGNAL

Frank C. Ferk, Chicago, Ill.

Application November 13, 1933, Serial No. 697,849

6 Claims. (Cl. 177—311)

My invention relates to motorcar signals of the type warning the driver that someone is stealing a ride, and it is my main object to provide a signal of this kind which is operated by an attachment applied to the rear bumper and actuated when the unauthorized ride is taken on the latter.

A further object of the invention is to provide a simple and inconspicuous attachment for the bumper, which is intended to receive the weight of the unauthorized rider and so operate the signal.

A still further object of the invention is to construct the novel attachment on lines of good balance and simplicity, and design the same for actuating any suitable signal, such as an audible or visual alarm.

With the above objects in view, and any others which may suggest themselves from the description and claims to follow, a better understanding of the invention may be had by reference to the accompanying drawing, in which—

Fig. 1 is a rear view of a typical motorcar, showing the application of the novel attachment;

Fig. 2 is an enlarged plan view of a bumper unit carrying the attachment;

Fig. 3 is a plan view of the attachment as applied to a portion of a typical bar bumper;

Fig. 4 is an elevation of the illustration in Fig. 3 with the bumper removed;

Figs. 5 and 6 are, respectively, sections on the lines 5—5 and 6—6 of Fig. 4; and Fig. 7 is a diagram of the electrical circuit required for the operation of the device.

It is a familiar fact that motorists are frequently imposed upon by boys or vagrants who "hitch" on the rear bumper in order to steal a ride. Often the motorist does not realize that this is going on and being observed by others than himself; and when he does discover the fact, he is usually obliged to stop and order the offender off. Also, accidents caused by the falling of the rider are at times embarrassing or costly to the motorist. In order to do away with the above nuisance and risk, I have devised a novel attachment by means of which a warning will be received by the driver that someone has mounted the bumper, thereby enabling the driver to attend to the matter promptly.

In carrying out the invention, specific reference to the drawing indicates the bar of a typical bumper 10 or bumperette at 10'. The novel attachment is intended to occupy a portion just inside or forward of the bar, and is of a length to apply singly in the case of a bumperette, as indicated in Fig. 2, or in two units along a regular bar bumper.

For the support of the attachment, I provide an elongated guard 11 formed with end flanges 11a which are secured to the forward side of the bumper bar by bolts 12. The guard 11 is offset in forward direction by bent portions 11b, so as to lie spacedly from the bar.

By reference to Figs. 4, 5, and 6, it will be noted that the guard 11 is formed with rearward bent portions 11c in three places along its course, these having upward extensions 11d.

By means of the receptacle formed between the guard 11 and its extensions 11d, I dispose an elongated bar 13 of fairly firm, yet readily bendable metal, such as lead, within the bracket. This bar is mounted at a height to be slightly above the bumper bar 10—in actual practice about three-eighths of an inch—so that it may first be depressed, when someone mounts the bumper. The bar 13 is molded with depending stems 14 which pass loosely through holes 11e in the bent portions 11c to be threaded and receive nuts 15 below the latter. Between the bent portions 11c and the bar 13, the stems 14 receive expansive springs 16. It will now be seen, particularly by reference to Fig. 4, that the bar 13 is held in the required position by being supported upon the springs 16, and that the latter will yield when the bar is weighted. Of course, the springs are to be of a relatively heavy gauge, so as to yield only when sufficient body weight is received by the bar and to be unaffected when the bar is tampered with by those who are curious.

In Fig. 6, it will be seen that the bar 13 receives at points between the center and the outer stems 14 metallic strips 17, these being of harder metal, such as copper, and soldered to the bar. A short distance below the strips 17 are vertical pins 19, these being threaded on their lower portions secured by and passing down through horizontal portions 19a bent back from the guard 11. The pins 19 are secured to the flanges by nuts 20 and 20a on each side thereof, and also form binding posts for an electrical conductor 21. Thus, when the bar 13 is weighted, its descent causes the strips 17 to make contact with the pins 19 and so establish an electrical circuit by way of the conductor 21 forming part of the electrical circuit which includes the motor car battery 22, a buzzer 23 or electric light, if desired, and a cut-off switch 24. The diagram in Fig. 7 shows that the circuit referred to is grounded; and, it is preferable that the signal 23 and the cut-off switch 24 be on the dash of the car or elsewhere handy for the attention of the driver, it being understood that the object of the switch 24 is to disconnect the signal in case it is not to be used or requires repair.

I have extended the medial bent portion 11c with a top rearward hook 11e to serve as a hanger over the top of the bumper bar 10 and brace the guard at the center. As to the control bar 13, making it of lead enables it to be easily bent to follow the curvature of the particular bumper or bumperette to which it is applied, without the use of special tools or great effort. The guard 11 is also bendable to conform with the course of the control bar wherever a curve occurs.

The structure shown in Figs. 1 and 2 differs from that of Figs. 3, 4, 5, and 6 only in that here the bumperette 10', control bar 13' and guard 11' are of curved form.

It will be understood from the above description that I have provided a simple and inconspicuous device in connection with the bumper to immediately apprise the driver that someone is stealing a ride, and therefore enable him to take necessary measures to put the offender off. I have provided two contact strips 17 in order to assure the operation of the device in case the bar 13 is weighted at one end only or unevenly. In case the control bar 13 tends to drop or sag somewhat and close the gaps of the electrical contacts, it can easily be boosted back by giving the nuts 15 a turn or two in a downward direction. Finally, the novel attachment is a device having few and simple parts, and may be depended upon to operate efficiently for a long time without appreciable attention or repair.

I claim:

1. A signal control for vehicles carrying a bumper bar comprising, a horizontal control bar along one side of the bumper bar, a guard on the outer side of the control bar and secured to the bumper bar, the control bar being spacedly disposed between the bumper bar and the guard for free vertical motion, yieldable means carried by the guard for the support of the control bar with the upper edge of the latter slightly higher than that of the bumper bar, and signal actuating means operated by the descent of the control bar.

2. A signal control for vehicles carrying a bumper bar formed with curved portions comprising, a horizontal control bar along one side of the bumper bar and of a material readily bendable to conform to the bumper bar curvatures, a guard carried by the bumper bar alongside the control bar and also bendable as the latter, yieldable means carried by the guard for the support of the control bar with the upper edge of the latter slightly higher than that of the bumper bar, and signal actuated means operated by the descent of the control bar.

3. A signal control for vehicles carrying a bumper bar comprising, a horizontal control bar along one side of the bumper bar, an elongated guard on the other side of the control bar and secured endwise to the bumper bar, transverse bottom portions bent from the guard below the control bar, yieldable means between the latter and said portions supporting the control bar with its upper edge slightly above that of the bumper bar, and signal actuating means operated by the descent of the control bar.

4. The structure of claim 3, said bent portions being perforated in the zones of said yieldable means, and the latter comprising screw stems freely depending from the control bar through the perforations in the bent portions, expansive springs on the stems between the control bar and said portions, and nuts carried below the latter by the stems.

5. The structure of claim 3, and upward extensions of the bent portions placed along said side of the bumper bar.

6. The structure of claim 3, upward extensions of the bent portions placed along said side of the bumper bar, and a top hook formed from one of the extensions to overhang the bumper bar and serve as a medial brace for the guard.

FRANK C. FERK.